United States Patent
Farley

(10) Patent No.: US 12,013,135 B2
(45) Date of Patent: Jun. 18, 2024

(54) SYSTEMS AND METHODS OF DETECTING AN OBSTRUCTED FURNACE AIR FILTER USING A FLAME SENSOR

(71) Applicant: Rheem Manufacturing Company, Atlanta, GA (US)

(72) Inventor: Darryl Farley, Fayetteville, AR (US)

(73) Assignee: Rheem Manufacturing Company, Atlanta, GA (US)

( * ) Notice: Subject to any disclaimer, the term of this patent is extended or adjusted under 35 U.S.C. 154(b) by 896 days.

(21) Appl. No.: 16/986,453

(22) Filed: Aug. 6, 2020

(65) Prior Publication Data

US 2022/0042706 A1 Feb. 10, 2022

(51) Int. Cl.
*F24F 11/64* (2018.01)
*B01D 46/00* (2022.01)
(Continued)

(52) U.S. Cl.
CPC .......... *F24F 11/64* (2018.01); *B01D 46/0086* (2013.01); *F23N 1/002* (2013.01);
(Continued)

(58) Field of Classification Search
CPC . F24F 11/64; F24F 11/39; F24F 11/52; B01D 46/0086; B01D 2279/00; F24H 3/006; G01K 3/005; G01K 7/021; F23N 1/002; F23N 2231/26; F23N 2225/08; F23N 2225/16; F23N 2229/00; F23N 5/24; F23N 5/14; F23N 5/10
See application file for complete search history.

(56) References Cited

U.S. PATENT DOCUMENTS

| 4,688,547 A | 8/1987 | Ballard et al. |
| 5,451,929 A | 9/1995 | Adelman et al. |

(Continued)

FOREIGN PATENT DOCUMENTS

| CN | 110701941 A | 1/2020 |
| CN | 110701942 A | 1/2020 |

(Continued)

OTHER PUBLICATIONS

H.L.M. Lee, Advantages and Disadvantages of Using Thermocouples, Sep. 4, 2019 https://sciencing.com/advantages-disadvantages-using-thermocouples-6153729.html (Year: 2019).*
(Continued)

*Primary Examiner* — Edelmira Bosques
*Assistant Examiner* — Michael James Giordano
(74) *Attorney, Agent, or Firm* — Eversheds Sutherland (US) LLP

(57) ABSTRACT

The disclosed technology includes systems and methods for detecting an at least partially obstructed air filter in a furnace. The disclosed technology can include a system and method that can receive temperature data from a flame sensor configured to detect a temperature of a flame in a burner, determine that an air filter associated with the burner is at least partially obstructed by determining that the temperature data indicates the flame temperature is greater than or equal to a threshold temperature, and output an alarm signal indicating that the air filter is at least partially obstructed.

17 Claims, 4 Drawing Sheets

(51) Int. Cl.
*F23N 1/00* (2006.01)
*F24F 11/39* (2018.01)
*F24F 11/52* (2018.01)
*F24H 3/00* (2022.01)
*G01K 3/00* (2006.01)
*G01K 7/02* (2021.01)

(52) U.S. Cl.
CPC .............. *F24F 11/39* (2018.01); *F24F 11/52* (2018.01); *F24H 3/006* (2013.01); *G01K 3/005* (2013.01); *G01K 7/021* (2013.01); *B01D 2279/00* (2013.01); *F23N 2225/16* (2020.01); *F23N 2229/00* (2020.01)

(56) References Cited

U.S. PATENT DOCUMENTS

| | | | |
|---|---|---|---|
| 6,354,367 | B1 | 3/2002 | Gong et al. |
| 6,535,838 | B2 | 3/2003 | Abraham et al. |
| 6,550,273 | B2 | 4/2003 | Fujitaka et al. |
| 6,616,428 | B2 | 9/2003 | Ebara et al. |
| 9,188,372 | B2 | 11/2015 | Thomas et al. |
| 9,360,259 | B2 | 6/2016 | Oritani et al. |
| 9,448,013 | B2 | 9/2016 | Ito et al. |
| 9,651,317 | B2 | 5/2017 | Jindou et al. |
| 9,677,818 | B2 | 6/2017 | Numata et al. |
| 10,035,937 | B2 | 7/2018 | Yana Motta et al. |
| 10,180,257 | B2 | 1/2019 | Cur et al. |
| 10,287,469 | B2 | 5/2019 | Kontomaris et al. |
| 10,539,358 | B2 | 1/2020 | Suzuki et al. |
| 10,823,407 | B2 | 11/2020 | Mullin et al. |
| 2009/0084129 | A1 | 4/2009 | Kim et al. |
| 2009/0107167 | A1 | 4/2009 | Kim et al. |
| 2010/0193155 | A1 | 8/2010 | Nakatani et al. |
| 2012/0323377 | A1 | 12/2012 | Hoglund et al. |
| 2016/0314677 | A1 | 10/2016 | Breslin |
| 2017/0131034 | A1 | 5/2017 | Ribarov et al. |
| 2018/0140989 | A1 | 5/2018 | Arthur et al. |
| 2019/0368817 | A1 | 12/2019 | Huang et al. |
| 2020/0149749 | A1 | 5/2020 | Tallakson et al. |
| 2021/0190365 | A1 * | 6/2021 | King .................. F24F 11/76 |

FOREIGN PATENT DOCUMENTS

| | | | |
|---|---|---|---|
| CN | 110848814 A | 2/2020 | |
| CN | 210741214 U | 6/2020 | |
| EP | 2306122 B1 | 7/2017 | |
| JP | S63254315 A * | 10/1988 | |
| JP | 5665937 B1 | 2/2015 | |
| JP | 2015049004 A | 3/2015 | |
| KR | 20050048392 A | 5/2005 | |
| KR | 20140053457 A * | 5/2014 | ............... F23N 5/24 |
| KR | 101681585 B1 | 12/2016 | |
| WO | WO-2008025783 A2 * | 3/2008 | ........... F23D 14/583 |
| WO | 2014156190 A1 | 2/2017 | |
| WO | 2017103988 A1 | 6/2017 | |

OTHER PUBLICATIONS

Kaltra GmbH (Apr. 9, 2018). "Microchannel heat exchangers as an advanced alternative to traditional HVAC coils", available at https://www.kaltra.com/single-post/2018/04/09/microchannel-heat-exchangers.

* cited by examiner

SYSTEMS AND METHODS OF DETECTING AN OBSTRUCTED FURNACE AIR FILTER USING A FLAME SENSOR

FIELD OF TECHNOLOGY

The present disclosure relates generally to systems and methods for detecting an obstructed air filter in a burner assembly, and, more specifically, to systems and methods for detecting an obstructed air filter in a furnace.

BACKGROUND

Gas burner assemblies, such as those used in a furnace, boiler, or water heater, utilize a mixture of air and fuel to create a flame. The heat generated by the flame can be used to heat water or air used in residential and industrial applications. In many cases, the air entering the burner assembly system is filtered to prevent foreign matter from entering the burner assembly and altering the flame output or otherwise affecting the performance of the burner assembly. The filter, however, can become obstructed over time and restrict the air admitted into the burner system. When the air becomes obstructed, the flame temperature rises and an increased amount of particulates (e.g., carbon dioxide, carbon monoxide, nitrogen oxides, etc.) are emitted to the atmosphere as the flame is no longer able to burn the fuel efficiently. The increased particulate emission can be harmful to the environment and can run afoul of local regulations. Furthermore, if left undetected, the filter can become restricted to the point where the filter is entirely clogged and the burner system is rendered inoperable.

To help ensure the air filter does not become obstructed to the point where the burner assembly begins to emit an undesirably high amount of particulates, some burner systems monitor the pressure differential across the air filter. As the air filter becomes obstructed, the pressure differential across the air filter will increase and reach a threshold pressure differential where the system will either shutdown or transmit an alarm. One method of monitoring the pressure differential across the air filter includes using a normally-closed differential pressure switch that is configured to open when the pressure differential reaches the threshold differential pressure. As the pressure switch opens, the fuel valve is de-energized and closes to extinguish the flame and prevent the burner assembly from emitting unacceptable levels of particulates to the atmosphere. This configuration, however, is limited because the normally-closed switch must be physically checked by a technician to ensure the switch is working. That is, because the switch is normally closed, it could be malfunctioning or inoperable such that it does not transition to an open state, and to identify such malfunction or inoperability, the normally-closed switch must be serviced and/or inspected, typically by a technician.

What is needed, therefore, is a method and system for detecting an obstructed air filter quickly with a device that can be verified as operational without the need for servicing the burner system. This and other problems are addressed by the technology disclosed herein.

SUMMARY

The disclosed technology relates generally to systems and methods for detecting an obstructed air filter in a burner assembly, and, more specifically, to systems and methods for detecting an obstructed air filter in a furnace.

The disclosed technology can include, a non-transitory computer-readable medium that can have instructions stored on it that, when executed by one or more processors, cause a system to receive, from a flame sensor, temperature data indicative of a temperature of a flame in a burner. The system can determine that an air filter associated with the burner is at least partially obstructed by determining with the temperature data that the temperature of the flame in the burner is greater than or equal to a threshold temperature. The system can also output an alarm signal indicating that the air filter is at least partially obstructed.

The system can also determine that the air filter is at least partially obstructed by determining that the temperature data indicates that the temperature of the flame is greater than or equal to a second threshold temperature and output a control signal for a fuel valve associated with the burner to at least partially close. The second threshold temperature can be greater than the first threshold temperature. As an example, the first threshold temperature can be a temperature greater than or equal to approximately 1900° F. and less than approximately 2000° F. and the second threshold temperature can be a temperature greater than or equal to 2000° F.

The system can also determine that the air filter is at least partially obstructed by determining that the temperature data indicates that the temperature of the flame is greater than or equal to the threshold temperature for a predetermined amount of time and output an alarm signal indicating that the air filter is at least partially obstructed. Alternatively, or in addition, the system can determine that the air filter is at least partially obstructed by determining that the temperature data indicates that the temperature of the flame is greater than or equal to a second threshold temperature for a second predetermined amount of time and output a control signal for a fuel valve associated with the burner to at least partially close. The second threshold temperature can be greater than or equal to the threshold temperature and the second predetermined amount of time can be greater than or equal to the predetermined amount of time.

The disclosed technology can also include a furnace having an air filter obstruction detection system. The furnace can have an air inlet, and air filter for filtering out particles from air passing through the air inlet, and an air moving device configured to move the air from the inlet, through the air filter, and toward a combustion chamber. The furnace can also have a fuel valve configured to direct fuel into the air directed toward the combustion chamber, a burner configured to create a flame by burning a mixture of the fuel and the air, and a flame sensor configured to detect a temperature of the flame. Additionally, the furnace can have a controller configured to receive temperature data from the flame sensor, determine that the temperature data indicates a temperature of the flame being greater than or equal to a threshold temperature, determine that the air filter is at least partially obstructed, and output an alarm signal indicating that the air filter is at least partially obstructed.

The controller can be configured to output a control signal for the fuel valve to at least partially close, based at least in part on determining that the temperature of the flame is greater than or equal to the threshold temperature or a second threshold temperature. The second threshold temperature can be greater than the threshold temperature.

The flame sensor can be a thermocouple.

The controller can also be configured to determine, based on the temperature data, that the temperature of the flame is greater than or equal to the threshold temperature for a predetermined amount of time and output an alarm signal indicating that the air filter is at least partially obstructed.

The controller can also be configured to determine, based at least in part on the temperature data, that the temperature of the flame is greater than or equal to the threshold temperature for a second predetermined amount of time and output a control signal for the fuel valve to at least partially close.

The controller can also be configured to determine, based at least in part on the temperature data, that the temperature of the flame is greater than or equal to a second threshold temperature for a second predetermined amount of time and output a control signal for the fuel valve to at least partially close. The second threshold temperature can be greater than the threshold temperature.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

DETAILED DESCRIPTION

Figure 1:
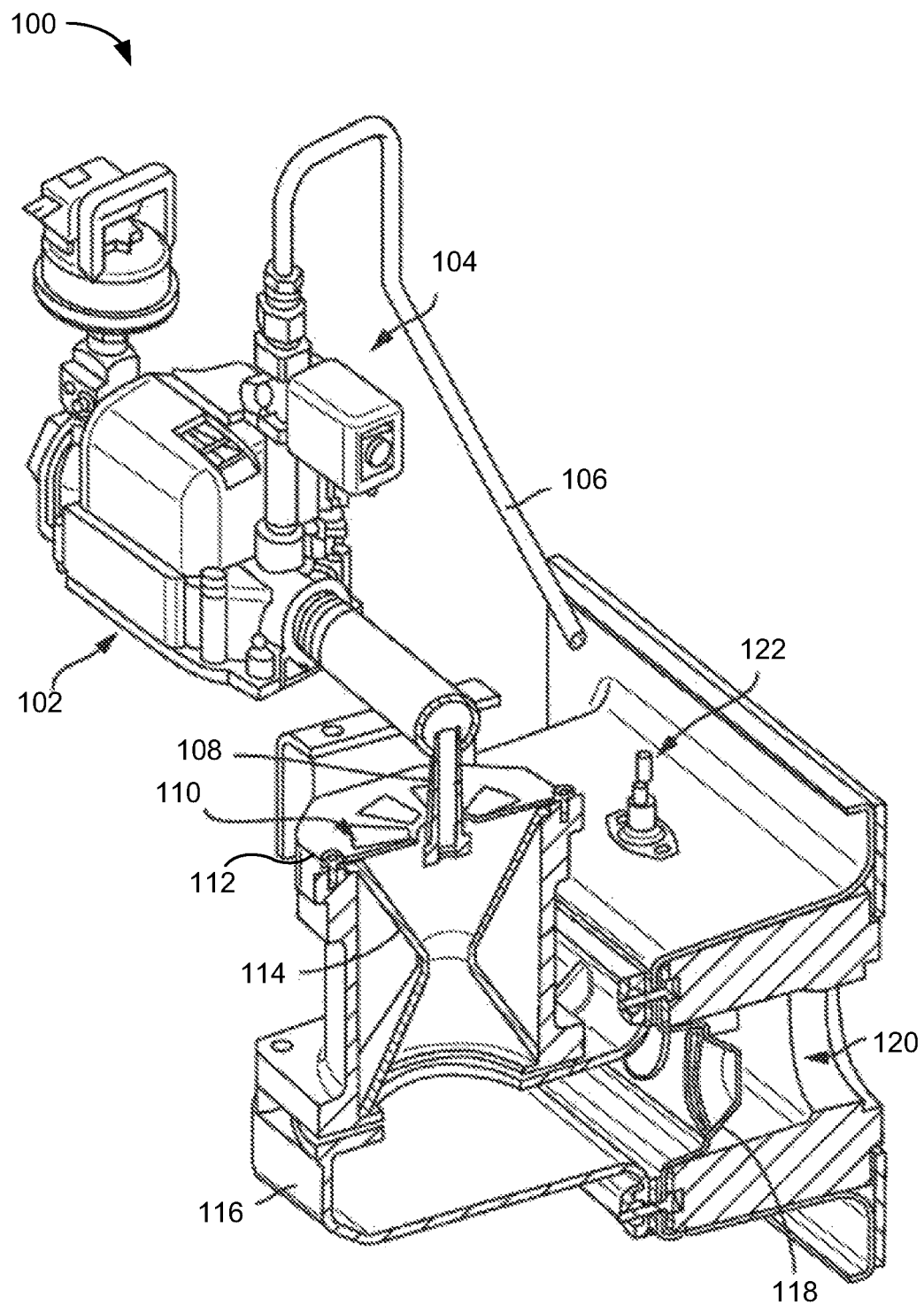
FIG. 1 illustrates an example burner assembly for a furnace, in accordance with the disclosed technology.

The disclosed technology relates generally to systems and methods for detecting an obstructed air filter in a burner assembly, and, more specifically, to systems and methods for detecting an obstructed air filter in a furnace. The system can include an air inlet, an air filter, a fuel valve, a burner assembly, a combustion chamber, a flame sensor, and a controller in communication with the flame sensor and the fuel valve. The system can optionally include an alarm device, and the controller can be in communication with the alarm device. The controller can receive temperature data from the flame sensor and determine, based on the temperature data, whether the air filter is likely to be at least partially obstructed. Upon determining that the air filter is likely to be at least partially obstructed, the controller can output an alarm signal to the alarm device and a control signal to the fuel valve to close the fuel valve. The disclosed technology can be used with any gas-fired system used to heat a fluid, including residential and commercial furnaces and water heaters, but is not so limited.

Although certain examples of the disclosed technology are explained in detail herein, it is to be understood that other examples, embodiments, and implementations of the disclosed technology are contemplated. Accordingly, it is not intended that the disclosed technology is limited in its scope to the details of construction and arrangement of components expressly set forth in the following description or illustrated in the drawings. The disclosed technology can be implemented in a variety of examples and can be practiced or carried out in various ways. In particular, the presently disclosed subject matter is described in the context of being a system and method for detecting an at least partially obstructed air filter in a burner assembly of a furnace. The present disclosure, however, is not so limited, and can be applicable in other contexts. The present disclosure, for example and not limitation, can include burner systems used in gas water heaters, boilers, and other systems having a burner assembly. Such implementations and applications are contemplated within the scope of the present disclosure. Accordingly, when the present disclosure is described in the context of being a system and method for detecting an at least partially obstructed air filter in a burner assembly of a furnace, it will be understood that other implementations can take the place of those referred to.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the examples, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the various examples of the disclosed technology includes from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the example methods and processes described herein. That is, the disclosed technology includes methods that omit one or more steps expressly discussed with respect to the examples provided herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

Referring now to the drawings, in which like numerals represent like elements, examples of the present disclosure are herein described. FIG. 1 illustrates an example burner assembly 100 (e.g., a burner assembly for a furnace), in accordance with the disclosed technology. Although the burner assembly 100 is depicted as an ultra-low $NO_x$ burner (a ULN burner) in FIG. 1, the burner assembly 100 can be any type of burner assembly that includes an air filter and a flame sensor.

The example burner assembly 100 can begin the ignition process by providing a mixture of air and fuel to a burner 118. The air can be provided by, for example, powering an air moving device (not shown in FIG. 1) to draw air through the burner assembly 100 and the fuel can be provided to the burner 118 by opening a fuel valve 102 to deliver fuel to the burner 118 (e.g., via a fuel delivery tube 108). Optionally, the burner assembly 100 can include a venturi air/fuel mixer 114, and the fuel valve 102 can open to deliver fuel through the fuel delivery tube 108 to the venturi air/fuel mixer 114. The venturi air/fuel mixer 114 can help to ensure air and fuel are mixed before entering the burner 118. If a venturi air/fuel mixer 114 is used, the negative pressure created at the venturi air/fuel mixer 114 can draw air into the venturi air/fuel mixer 114 through an optional air diffuser 112. To prevent particles from entering the burner assembly 100, the air diffuser 112 (or another portion of the burner assembly 100) can include an air filter 110. As will be appreciated, the air diffuser 112 and/or air filter 110 can be positioned in several different locations, such as upstream of an air/fuel mixing chamber 116, upstream of the venturi air/fuel mixer 114, downstream of the fuel delivery tube 108, downstream of the air/fuel mixing chamber 116, and/or upstream of the burner 118. Optionally, the burner assembly 100 can include multiple air diffusers 112 and/or air filters 110 in various locations, which can help diffuse and filter the air/fuel mixture delivered to the burner and/or encourage efficient mixing of the air/fuel mixture.

The mixture of air and fuel can then be passed to an optional air/fuel mixing chamber 116, where further mixing of the air and fuel can occur, and then to the burner 118 where an igniter (not shown) can ignite the air/fuel mixture to create a flame and direct heat through the combustion chamber 120. In situations where additional fuel is desirable, such as during the ignition process, the burner assembly 100 can utilize a fuel enrichment valve 104 to deliver a supply of fuel directly to the burner 118 (e.g., via the fuel enrichment delivery tube 106). As will be appreciated, the burner assembly 100 can include more or fewer components than those expressly described herein.

A flame sensor 122 can also be located in the combustion chamber, or otherwise proximate the flame, to detect a temperature of the flame. While certain existing systems may include a flame sensor, the flame sensor of such systems is typically configured only to detect the presence or absence of a flame. The disclosed technology, in contrast, provides added capabilities that are unavailable in existing systems. As discussed further herein, the flame sensor 122 of the present disclosure can replace the binary-response flame sensor of existing systems and can be configured to detect temperature data indicative of a temperature of the flame and transmit the detected temperature data to a controller or other computing device. This functionality enables the controller to monitor the temperature of the flame and make certain determinations based at least in part on the temperature data. For example, and as described more fully herein, temperature data received from the flame sensor 122 can be used to determine whether an air filter (e.g., air filter 110) is at least partially obstructed.

Figure 2:
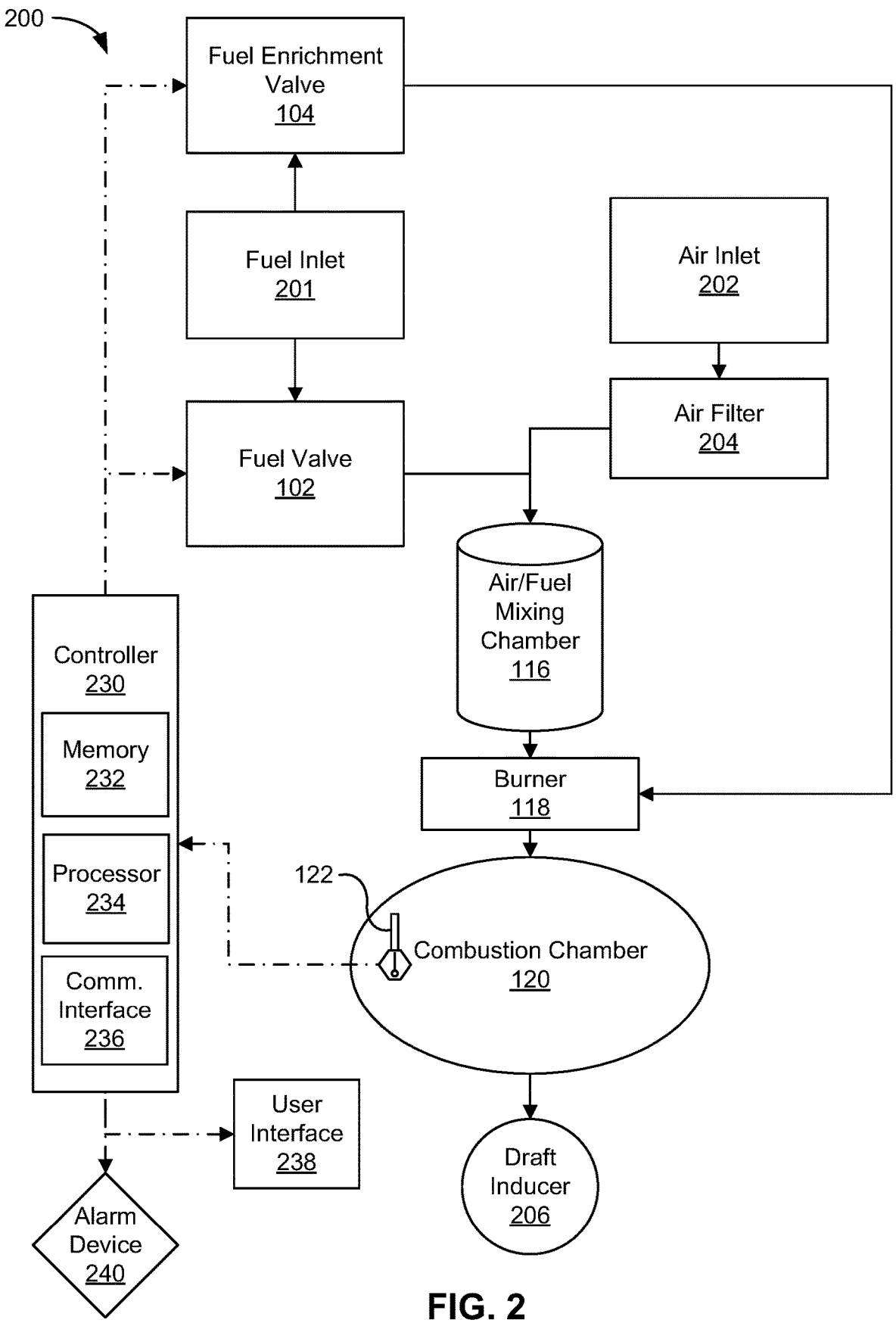
FIG. 2 illustrates a schematic diagram of an example system for detecting an obstructed air filter in a burner assembly, in accordance with the disclosed technology.

FIG. 2 is a schematic diagram illustrating a system 200 for detecting an at least partially obstructed air filter in a burner assembly, in accordance with an example of the disclosed technology. A system 200 for detecting an at least partially obstructed air filter in a burner assembly (e.g., burner assembly 100) can have a fuel inlet 201 that is in fluid communication with the same or similar elements as those previously described in relation to FIG. 1, such as a fuel valve 102, a fuel enrichment valve 104, an air/fuel mixing chamber 116, a burner 118, and a combustion chamber 120. The system 200 can also have an air inlet 202 and an air filter 204. The air inlet can be the same as air diffuser 112 or it can be a different air inlet depending on the particular application. Similarly, the air filter 204 can be the same as air filter 110 or air filter 204 can be a different air filter depending on the particular application. The system 200 can be configured to draw air through the system 200 by an air moving device 206. Furthermore, the system 200 can have a controller 230 having a memory 232, a processor 234, and a communication interface 238. The controller can be in communication with the fuel valve 102, a flame sensor 122, a user interface 238, and/or an alarm device 240.

The system 200 can be operated in the same or similar manner to create a flame as previously described in relation to FIG. 1. For instance, the air moving device 206 can cause air to be drawn through the system, fuel valve 102 can open to pass an amount fuel to the burner 118, and the mixture of air and fuel can be ignited at the burner 118 to create a flame.

The heat generated by the flame can be detected by a flame sensor 122 and the temperature data can be transmitted to the controller 230. The flame sensor 122 can be any type of flame sensor or temperature sensor capable of detecting a temperature of the flame. For example, the flame sensor 122 can be or include a thermocouple, a resistor temperature detector (RTD), a thermistor, an infrared sensor, a semiconductor, or any other suitable type of sensor for the application. As will be appreciated, the type of flame sensor 122 chosen for the application can be capable of withstanding and detecting the temperatures of the flame in the specified application.

The air moving device 206 can be any type of air moving device configured to draw air through the system. For example, the air moving device 206 can be a draft inducer, fan, a blower, or any other air moving device configured to move air through the system.

The controller 230 can have a memory 232, and a processor 234, and be in communication with a user interface 238. The controller 230 can be a computing device configured to receive data, determine actions based on the received data, and output a control signal instructing one or more components of the system to perform one or more actions. One of skill in the art will appreciate that the controller 230 can be installed in any location, provided the controller 230 is in communication with at least some of the components of the system. Furthermore, the controller 230 can be configured to send and receive wireless or wired signals and the signals can be analog or digital signals. The wireless signals can include Bluetooth™, BLE, WiFi™, ZigBee™, infrared, microwave radio, or any other type of wireless communication as may be appropriate for the particular application. The hard-wired signal can include any directly wired connection between the controller and the other components. For example, the controller 230 can have a hard-wired 24 VDC connection to the flame sensor 122. Alternatively, the components can be powered directly from a power source and receive control instructions from the controller 230 via a digital connection. The digital connection can include a connection such as an Ethernet or a serial connection and can utilize any appropriate communication protocol for the application such as Modbus, fieldbus, PROFIBUS, SafetyBus p, Ethernet/IP, or any other appropriate communication protocol for the application. Furthermore, the controller 230 can utilize a combination of wireless, hard-wired, and analog or digital communication signals to communicate with and control the various components. One of skill in the art will appreciate that the above configurations are given merely as non-limiting examples and the actual configuration can vary depending on the application.

The controller 230 can include a memory 232 that can store a program and/or instructions associated with the functions and methods described herein and can include one or more processors 234 configured to execute the program and/or instructions. The memory 232 can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including the operating system, application programs (including, for example, a web browser application, a widget or gadget engine, and or other applications, as necessary), executable instructions and data. One, some, or all of the processing techniques or methods described herein can be implemented as a combination of executable instructions and data within the memory.

The controller 230 can also have a communication interface 236 for sending and receiving communication signals between the various components. Communication interface 236 can include hardware, firmware, and/or software that allows the processor(s) 234 to communicate with the other components via wired or wireless networks, whether local or wide area, private or public, as known in the art. Communication interface 236 can also provide access to a cellular network, the Internet, a local area network, or another wide-area network as suitable for the particular application.

Additionally, the controller 230 can have or be in communication with a user interface 238 for displaying system information and receiving inputs from a user. The user interface 238 can be installed locally on the system 200 or be a remotely-control device such as a mobile device. The user, for example, can input data to set the temperature range of expected normal operating flame temperatures and expected flame temperatures exhibited when the filter 204 is at least partially obstructed. The user can also program threshold flame temperatures (e.g., an alarm temperature and a high-limit temperature) for the controller 230 to determine when to take certain actions based on the flame temperature. For example, the alarm temperature can be a threshold temperature that can indicate that the air filter 204 is at least partially obstructed and should be cleaned. On the other hand, the high-limit temperature can be a second threshold temperature greater than the alarm temperature that can indicate that the air filter 204 has become obstructed to the point that the system 200 should be shut down before the system 200 is damaged. The high-limit temperature can correspond to a level of air filter obstruction that is greater than a level of air filter obstruction corresponding to the alarm temperature.

The alarm device 240 can be any form of alarm device configured to provide a notification to a user. For example, the alarm device 240 can be a light bulb or light emitting diode (LED) indicator configured to illuminate on the system 200 or another location likely to be seen by a user. As another example, the alarm device 240 can be an audible alarm or alert. Alternatively, or in addition, the controller can transmit instructions for displaying a notification on the user interface 238 and/or can transmit a notification to a user's mobile device. As will be appreciated, the alarm device 240 can be any type of alarm device configured to provide notification to a user that the air filter 204 is at least partially obstructed.

The fuel valve 102 and the fuel enrichment valve 104 can be configured to control a flow of fuel from a fuel source. Both the fuel valve 102 and the fuel enrichment valve 104 can be configured for any type of fuel used in the burner assembly 100, such as, for example, propane, butane, natural gas, coal gas, biogas, acetylene, gasoline, diesel fuel, or any other type of fuel suitable for the application. Furthermore, the fuel valve 102 and the fuel enrichment valve 104 can be any type of fuel valve as would be suitable for the particular application. For example, the fuel valve 102 and the fuel enrichment valve 104 can be a solenoid operated valve configured to be normally closed such that a loss of power causes the solenoid operated valve to close and prevent fuel from passing through the burner assembly 100. The fuel valve 102 and the fuel enrichment valve 104 can be controlled by the controller 230 based on inputs received at the controller 230 from the flame sensor 122.

As depicted in FIG. 2, the flame sensor 122 can be in communication with the controller 230 and provide temperature data to the controller 122, the temperature data being indicative of the current temperature of the flame. The flame sensor 122 can be located proximate the flame in the combustion chamber, or otherwise near the burner, such that the flame sensor 122 can detect a current temperature of the flame. The controller 230 can then receive and monitor the temperature data provided by the flame sensor 122 to detect when the temperature of the flame reaches a predetermined threshold temperature. The predetermined threshold temperature can be a temperature indicative of an at least partially obstructed air filter 204. For example, as will be appreciated by those skilled in the art, as an air filter 204 becomes at least partially obstructed, less air is able to enter the system which can cause the flame to burn with a higher concentration of fuel and increase the temperature of the flame and the resultant particulates created by the combustion process. As an example, a normal operation flame temperature in certain systems can be in the range of approximately 1500° F. to approximately 1900° F., whereas a flame temperature of the same system with an at least partially obstructed air filter 204 can be in excess of approximately 2000° F. As will be appreciated, the particular temperature ranges can vary depending on the type of burner system and the particular application (e.g., gas water heater, boiler, etc.). Despite variances in normal and abnormal flame temperatures across different systems, the controller 230 can be configured to detect changes in the flame temperature of the particular system that can indicate the air filter 204 is at least partially obstructed. For example, the controller 230 can be individually programmed for the specific system to account for differences in flame temperature in the system.

One way the controller 230 can be configured to detect changes in the flame temperature across various types of burner systems is for the controller 230 to be individually programmed at the factory or by a technician or user during installation. Alternatively, the controller 230 can store a program in the memory 232 that, when executed by the processor 234, can cause the controller 230 to monitor and trend historical operational temperatures to determine a normal operating flame temperature. As the controller 230 continues to monitor the flame temperature over time, the controller 230 can determine that the flame temperature has increased beyond the normal operating temperature for the system and is in a temperature range associated with an at least partially obstructed air filter 204. Alternatively, or in addition, the controller 230 can use the stored temperature data to determine an alarm temperature and a high-limit temperature. For example, if the stored temperature data indicates a normal operating flame temperature range, the controller can determine that an alarm temperature is 200° F. greater than the normal operating flame temperature range and that the high-limit temperature is 400° F. greater than the normal operating flame temperature range.

When the controller 230 determines that an air filter 204 is at least partially obstructed, the controller 230 can output an alarm signal to an alarm device 240 and/or the user interface 238. The controller 230 can alternatively, or in addition, output a control signal to the fuel valve 102 and the fuel enrichment valve 104. For example, the controller 230, upon determining that an air filter 204 is at least partially obstructed, can output an alarm signal to the alarm device 240 to notify a user that the air filter is at least partially obstructed. The alarm device 240 can be or include any of the alarm devices previously described to notify the user. Alternatively, or in addition, the controller 230 can output a control signal to the fuel valve 102 to close the fuel valve 102. The control signal can be or include a control signal that de-energizes the solenoid of the fuel valve 102 to close the fuel valve 102. The controller 230 can also output a control signal to the fuel enrichment valve 104 to close the fuel enrichment valve 104 if the fuel enrichment valve 104 is open at the time the controller 230 determines the air filter 204 is at least partially obstructed. By closing both the fuel valve 102 and the fuel enrichment valve 104, the controller 230 can ensure that fuel is no longer supplied to the system 200 and the flame is extinguished. In this way, the controller 230 can act to protect the system 200 from damage that could occur from operating the system 200 with a high flame temperature caused by an at least partially obstructed air filter.

The controller 230 can determine that an air filter 204 is likely to be at least partially obstructed by monitoring the flame temperature received from the flame sensor 122 to determine when the flame temperature has reached a predetermined flame temperature. For example, the controller 230 can monitor the flame temperature and determine that air filter 204 is likely to be at least partially obstructed when the temperature of the flame reaches 1900° F., 2000° F., 2100° F., 2500° F., 3500° F., 5000 F, or any other temperature that would be applicable to the particular system. As will be appreciated by those of skill in the art, the predetermined temperature can be any temperature applicable to the system and, as previously described, can be manually set and/or can be determined by the controller 230.

Alternatively, the controller 230 can monitor the flame temperature to determine when the flame temperature has been greater than or equal to a predetermined temperature for a predetermined amount of time. By monitoring the flame temperature to determine if it has been greater than or equal to a predetermined temperature for a predetermined amount of time, the controller 230 can account for anomalies in temperature data, temporary obstructions in the air filter or in the system, temporary excess fuel supplied to the system, a temporary slowing or stopping of the air moving device 206, pressure variations in the flue caused by external winds, and other temporary conditions that can cause the flame temperature to be greater than the normal operating temperature but are not indicative of an at least partially obstructed air filter. The predetermined temperature can be the same or a different predetermined temperature than that just described. Furthermore, the predetermined amount of time can be any amount of time determined suitable for the particular application. For example, the predetermined amount of time can be a fraction of a second (e.g., 0.2 s) or several minutes depending on the particular application.

Figure 3:
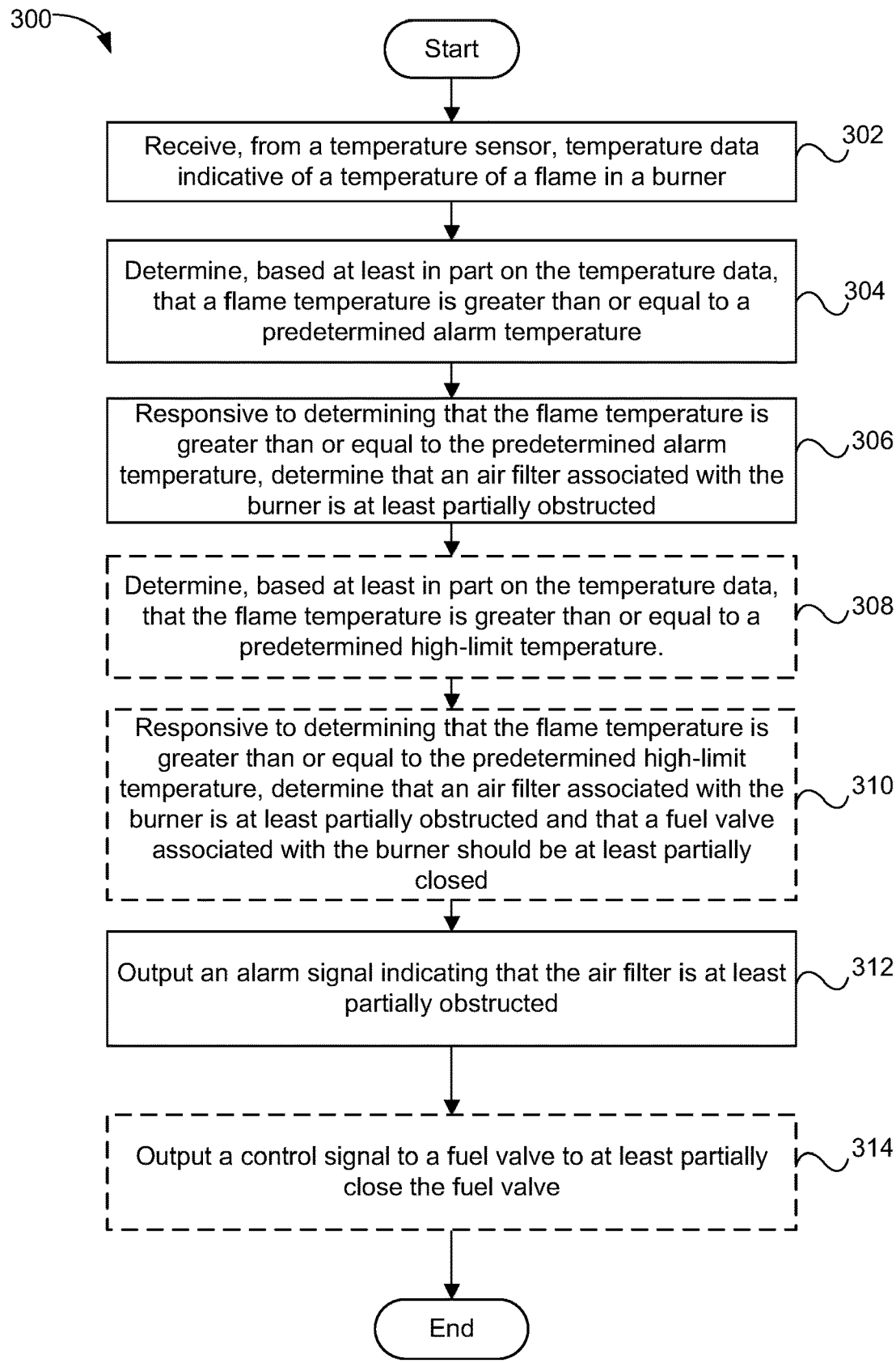
FIG. 3 is a flowchart illustrating an example method of detecting an obstructed air filter in a burner assembly, in accordance with the disclosed technology.
Figure 4:
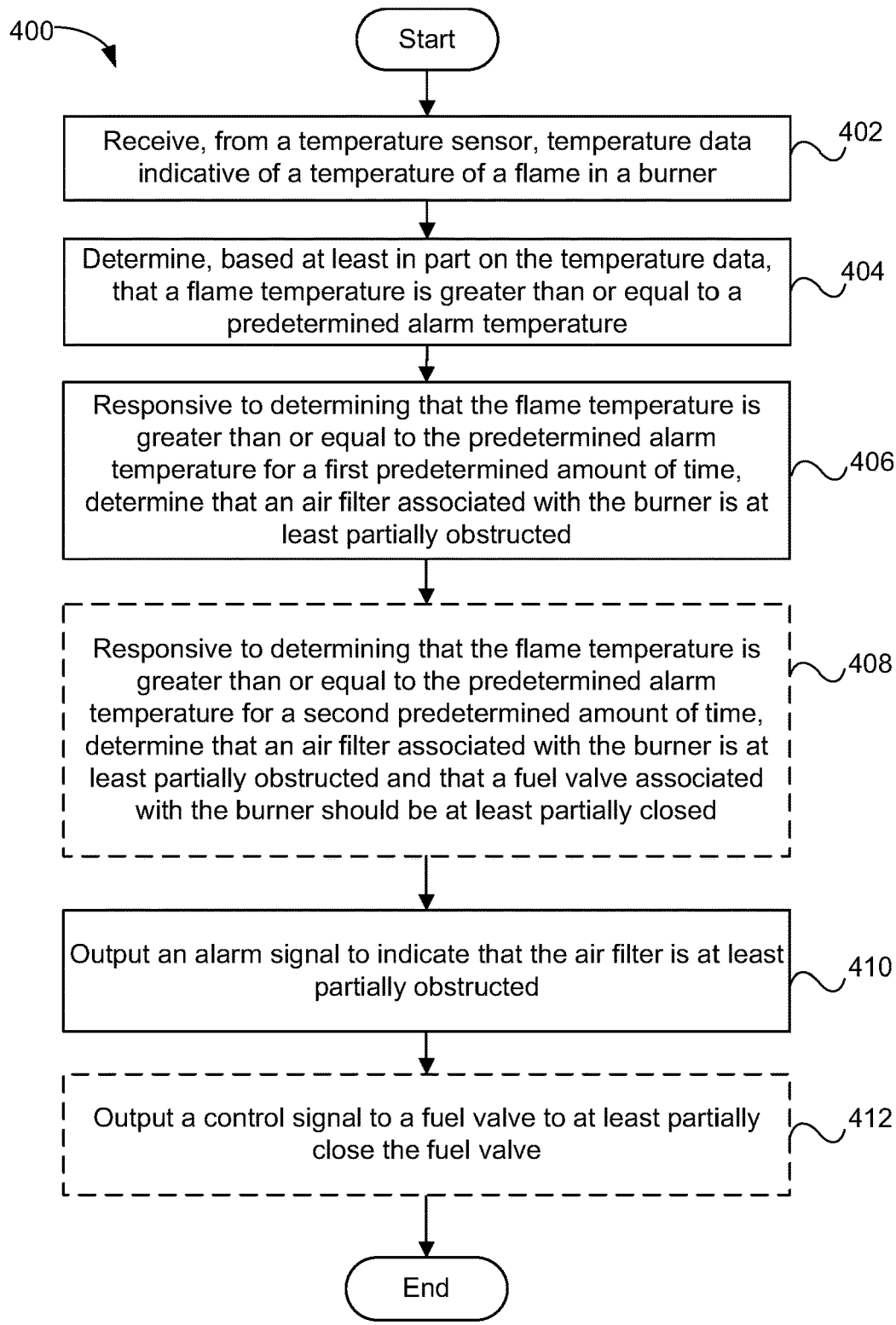
FIG. 4 is a flowchart illustrating another example method of detecting an obstructed air filter in a burner assembly, in accordance with the disclosed technology.

The system 200 depicted in FIG. 2 can be operated according to the methods described above and/or according to the various methods described herein, such as the methods depicted in FIGS. 3 and 4. As will be appreciated, the methods described can be executed by the controller 230 in communication with the various elements (e.g., flame sensor 122, fuel valve 102, fuel enrichment valve 104, alarm device 240, etc.).

FIG. 3 is flowchart illustrating a method of detecting an at least partially obstructed air filter in a burner assembly, in accordance with an example of the disclosed technology. The method 300 can include receiving 302, from a flame sensor (e.g., flame sensor 122), temperature data indicative of a temperature of a flame (i.e., a flame temperature) in a burner. Once temperature data has been received, the method 300 can include determining 304, based at least in part on the temperature data, that the flame temperature is greater than or equal to a predetermined alarm temperature. Responsive to determining that the flame temperature is greater than or equal to the predetermined alarm temperature, the method 300 can include determining 306 that an air filter associated with the burner assembly (e.g., air filter 204 of burner assembly 100) is at least partially obstructed. Alternatively, or in addition, the method 300 can include determining 308, based at least in part on the temperature data, that the flame temperature is greater than or equal to a predetermined high-limit temperature. Responsive to determining that the flame temperature is greater than or equal to the predetermined alarm temperature, the method 300 can include determining 310 that the air filter is obstructed to such a degree that a fuel valve (e.g., fuel valve 102) should be at least partially closed (e.g., to prevent damage to the burner assembly, to prevent injury, etc.). The method 300 can include outputting 312 an alarm signal indicating that the air filter is at least partially obstructed. Alternatively, or in addition, the method 300 can include outputting 314 a control signal for the fuel valve to at least partially close the fuel valve. The predetermined high-limit temperature can be equal to the predetermined alarm temperature. Alternatively, the predetermined high-limit temperature can be greater than the predetermined alarm temperature. Optionally, in response to determining that the flame temperature is greater than or equal to the predetermined alarm temperature and/or that the flame temperature is greater than or equal to the predetermined high-limit temperature, the method can include automatically transmitting a request to schedule a service appointment with a burner service provider.

As will be appreciated, the method 300 just described can cause the burner assembly 100 to output an alarm when the flame temperature reaches a predetermined alarm temperature and, if the flame temperature continues to rise, output a control signal to close the fuel valve and extinguish the flame. In this way, during operating cycles where the flame temperature reaches the alarm temperature but not the high-limit temperature, the system can continue to operate and provide heat. The alarm can help to notify a user, technician, or other person that the air filter needs to be changed. Thus, if the operating cycle finishes without reaching the high-limit alarm temperature, the air filter can be replaced after the system has extinguished the flame at the burner without needing to extinguish the flame prematurely.

FIG. 4 is flowchart illustrating another example method 400 of detecting an at least partially obstructed air filter in a burner assembly, in accordance with the disclosed technology. The method 400 can include receiving 402, from a flame sensor, temperature data indicative of a temperature of a flame in a burner. The method 400 can include determining 404, based at least in part on the temperature data, that the flame temperature is greater than or equal to a predetermined alarm temperature. If the flame temperature is greater than or equal to the predetermined alarm temperature for at least a first amount of time, the method 400 can include determining 406 that an air filter associated with the burner assembly is at least partially obstructed. Alternatively, or in addition, responsive to determining that the flame temperature is greater than or equal to the predetermined alarm temperature for a second predetermined amount of time, the method 400 can also include determining 408 that the air filter is obstructed to such a degree that a fuel valve (e.g., fuel valve 102) should be at least partially closed (e.g., to prevent damage to the burner assembly, to prevent injury, etc.). The second amount of time can be equal to the first amount of time. Alternatively, the second amount of time can be greater than the first amount of time. The method 400 can include outputting 410 an alarm signal indicating that the air filter is at least partially obstructed and/or outputting 412 a control signal to a fuel valve to at least partially close the fuel valve. Optionally, in response to determining that the flame temperature is greater than or equal to the predetermined alarm temperature for the first amount of time and/or the second amount of time, the method 400 can include automatically transmitting a request to schedule a service appointment with a burner service provider.

By continuing to monitor the flame temperature for a predetermined amount of time (as depicted in block 406), the method 400 can help to avoid outputting an alarm when the flame temperature only briefly or temporarily reaches the predetermined alarm temperature. This can help reduce the likelihood that the method 400 will output an alarm unnecessarily (e.g., false positives or nuisance alarms).

Furthermore, by continuing to monitor the flame temperature for a second predetermined amount of time (as depicted in block 408), the method 400 can shut down the system to prevent damage to the system or excess particulates from being released to the atmosphere. For example, monitoring the flame temperature for a second predetermined amount of time can allow the user time to rectify the at least partially obstructed filter without the furnace being automatically shut down mid-cycle. Furthermore, monitoring the flame temperature for a second predetermined amount of time can decrease the likelihood that the system will be shutdown for a temporary temperature spike that would be less likely to cause damage to the system or operate with unacceptable emissions levels.

As will be appreciated, the methods 300 and 400 just described can be varied in accordance with the various elements and examples described herein. That is, methods in accordance with the disclosed technology can include all or some of the steps described above and/or can include additional steps not expressly disclosed above. Further, methods in accordance with the disclosed technology can include some, but not all, of a particular step described above. Further still, various methods described herein can be combined in full or in part. That is, methods in accordance with the disclosed technology can include at least some elements or steps of a first method (e.g., method 300) and at least some elements or steps of a second method (e.g., method 400).

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims.

What is claimed is:

1. A non-transitory, computer-readable medium having instructions stored thereon that, when executed by one or more processors, cause a system to:
   receive, from a flame sensor, temperature data indicative of a temperature of a flame in a burner;
   determine, based at least in part on the temperature data, that the temperature of the flame in a burner is greater than a first threshold temperature;
   determine, based at least in part on the temperature data, that the temperature of the flame is greater than a second threshold temperature, wherein the second threshold temperature is higher than the first threshold temperature;
   in response to the temperature of the flame being greater than both the first threshold temperature and the second threshold temperature, determine that an air filter associated with a mixing chamber is at least partially obstructed, wherein the mixing chamber is coupled to the burner;
   output an alarm signal indicating that the air filter is at least partially obstructed;
   output, via a controller, a first signal to a first fuel valve coupled to the mixing chamber;
   output, via the controller, a second signal to a second fuel valve coupled to the burner; and
   based on the first signal and the second signal, at least partially close the first and the second fuel valves.

2. The non-transitory, computer-readable medium of claim 1, wherein the threshold temperature comprises a temperature value greater than or equal to approximately 1900° F. and less than approximately 2000° F.

3. The non-transitory, computer-readable medium of claim 1, wherein the second threshold temperature comprises a temperature greater than or equal to 2000° F.

4. The non-transitory, computer-readable medium of claim 1, wherein:
   determining that the air filter is at least partially obstructed further comprises:
      determining, based at least in part on the temperature data, that the temperature of the flame is greater than or equal to the threshold temperature for a predetermined amount of time; and the instructions, when executed by the one or more processors, further cause the system to:
output the alarm signal indicating that the air filter is at least partially obstructed in response to determining that the temperature of the flame is greater than or equal to the threshold temperature for the predetermined amount of time.

5. The non-transitory, computer-readable medium of claim 4, wherein:

determining that the air filter is at least partially obstructed further comprises:
determining, based at least in part on the temperature data, that the temperature of the flame is greater than or equal to a second threshold temperature for a second predetermined amount of time; and the instructions, when executed by the one or more processors, further cause the system to:
output a control signal for a fuel valve associated with the burner to at least partially close.

6. The non-transitory, computer-readable medium of claim 1, wherein the second threshold temperature is equal to the threshold temperature.

7. The non-transitory, computer-readable medium of claim 5, wherein the second threshold temperature is greater than the threshold temperature.

8. The non-transitory, computer-readable medium of claim 5, wherein the second predetermined amount of time is equal to the predetermined amount of time.

9. The non-transitory, computer-readable medium of claim 5, wherein the second predetermined amount of time is greater than the predetermined amount of time.

10. A furnace having an air filter obstruction detection system, the furnace comprising:
an air inlet;
an air filter for filtering out particles in air passing through the air inlet;
an air moving device configured to move the air from the air inlet, through the air filter, and toward a combustion chamber;
a burner coupled to a mixing chamber and the combustion chamber and configured to create a flame by burning a mixture of fuel and the air;
a first fuel valve coupled to the mixing chamber and configured to direct the fuel into the mixing chamber;
a second fuel valve coupled to the burner;
a flame sensor configured to detect a temperature of the flame; and
a controller configured to:
receive temperature data from the flame sensor;
determine, based at least in part on the temperature data, that the temperature of the flame is greater than or equal to a first threshold temperature;
in response to determining that the temperature of the flame is greater than or equal to the first threshold temperature, determine that the air filter is at least partially obstructed;
output an alarm signal indicating that the air filter is at least partially obstructed;
send a first signal to the first fuel value;
send a second signal to the second fuel valve; and
cause, based respectively on the first signal and the second signal, the first and the second fuel valves to at least partially close.

11. The furnace of claim 10, wherein the controller is further configured to send at least the first signal, based at least in part on determining that the temperature of the flame is greater than or equal to a second threshold temperature.

12. The furnace of claim 11, wherein the second threshold temperature is greater than the first threshold temperature.

13. The furnace of claim 10, wherein the flame sensor is a thermocouple.

14. The furnace of claim 10, wherein the controller is further configured to:
determine, based at least in part on the temperature data, that the temperature of the flame is greater than or equal to the threshold temperature for a predetermined amount of time; and
output the alarm signal indicating that the air filter is at least partially obstructed in response to determining that the temperature of the flame is greater than or equal to the threshold temperature for the predetermined amount of time.

15. The furnace of claim 14, wherein the controller is further configured to:
determine, based at least in part on the temperature data, that the temperature of the flame is greater than or equal to the threshold temperature for a second predetermined amount of time; and
output a control signal for the fuel valve to at least partially close.

16. The furnace of claim 14, wherein the controller is further configured to:
determine, based at least in part on the temperature data, that the temperature of the flame is greater than or equal to a second threshold temperature for a second predetermined amount of time; and
output a control signal for the fuel valve to at least partially close.

17. The furnace of claim 16, wherein the second threshold temperature is greater than the threshold temperature.

* * * * *